Sept. 19, 1950     R. L. SIMPSON ET AL     2,523,068
SAFETY HEAD
Filed June 4, 1947     2 Sheets-Sheet 1
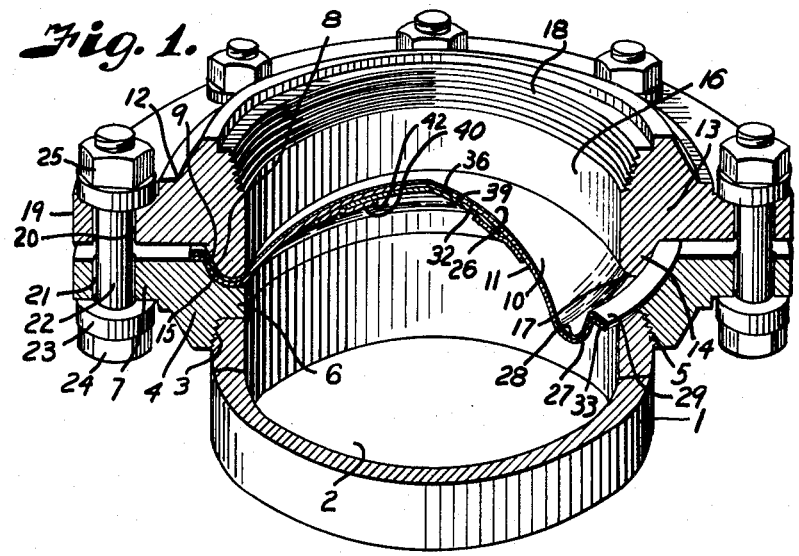
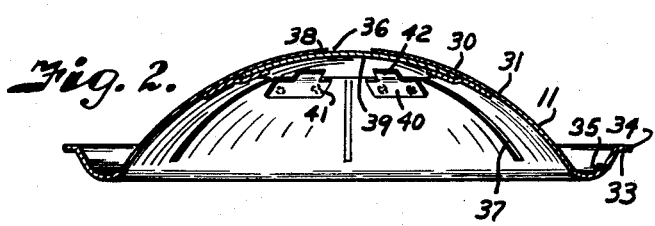
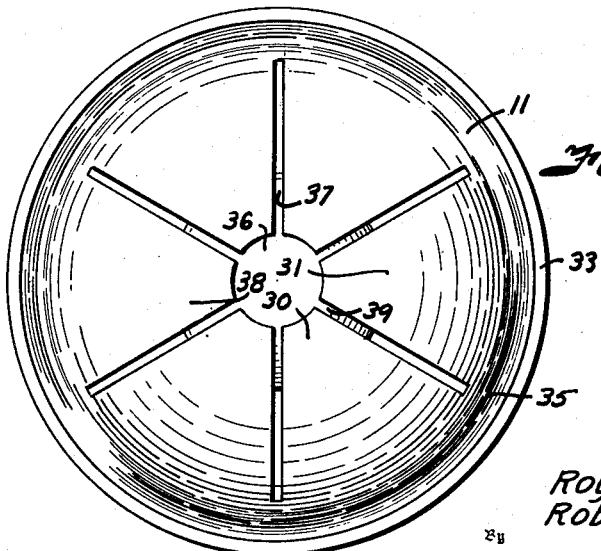
Inventors
Roy L. Simpson, and
Robert S. Coffman.
By Fishburn & Mullendore
Attorneys Sept. 19, 1950     R. L. SIMPSON ET AL     2,523,068
SAFETY HEAD Filed June 4, 1947     2 Sheets-Sheet 2

Inventors
Roy L. Simpson, and
Robert S. Coffman
By Fishburn & Mullendore
Attorneys Patented Sept. 19, 1950

2,523,068

UNITED STATES PATENT OFFICE 2,523,068

SAFETY HEAD

Roy L. Simpson, North Kansas City, and Robert S. Coffman, Kansas City, Mo., assignors to Black, Sivalls & Bryson, Inc., Kansas City, Mo., a corporation of Delaware Application June 4, 1947, Serial No. 752,540

8 Claims. (Cl. 220—89)

This invention relates to safety heads of the type disclosed in the Raymond Patent No. 1,930,960, issued October 17, 1933. Such safety heads are very satisfactory for use in protecting high pressure containing equipment but when used on equipment handling comparatively low internal pressures and occasional vacuums, the frangible diaphragms of the safety heads must be constructed of such thin material that they may deform or collapse under external pressures.

It is, therefore, a principal object of the present invention to provide a safety head of this character with an internal support that is contained within and sustains substantially the entire area of the diaphragm and which is adapted to open up to permit free relief when the diaphragm functions under predetermined pressure differentials.

It is also an object to provide a simple and reliable support for such diaphragms and which does not materially interfere with functioning of the diaphragm.

In accomplishing these and other objects of the invention hereinafter pointed out, we have provided improved structure, the preferred forms of which are illustrated in the accompany drawing wherein:

Fig. 1 is a perspective view partly in section of a safety head embodying the features of the present invention.

Fig. 2 is a section through the diaphragm support.

Fig. 3 is a plan view of the diaphragm support.

Figure 4:
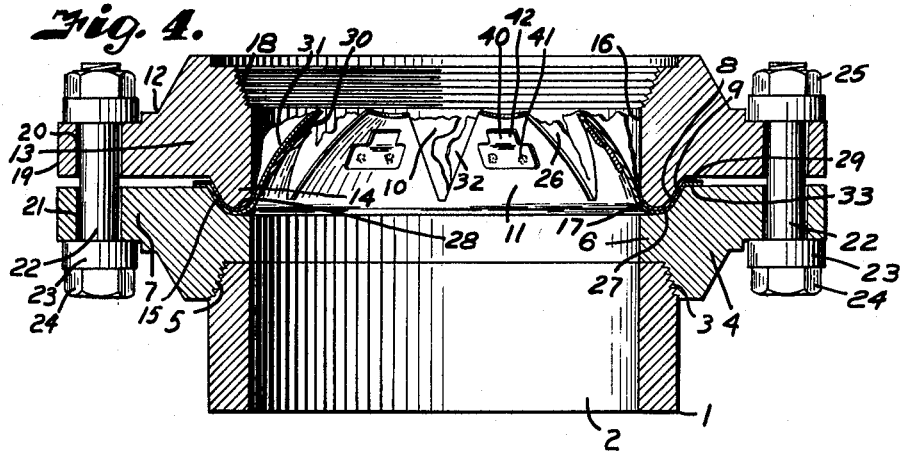
Fig. 4 is a vertical section through the safety head showing the diaphragm after it has been disrupted and the support opened under a predetermined pressure differential.

Referring more in detail to the drawings:

1 designates a tubular fitting that is adapted for connection with an equipment handling relatively low internal pressures and occasional vacuums. The fitting 1 has an internal diameter sufficient to provide a flow passageway 2 for the free relief of the pressure and the circumference thereof may be externally threaded as at 3 to mount a diaphragm seating and clamping ring 4. The clamping ring 4 is shown as including an internally threaded collar portion 5 engaging the external threads 3 and which has an internally extending annular rib 6 to abut against the end of the fitting. The ring 4 also includes a radially extending annular flange 7 encircling an annular shoulder-like recess 8 having an inclined face 9 outset from the rib 6 to provide a bevel seat and clamping face for the frangible diaphragm 10 and its supporting member 11.

Cooperating with the clamping ring 4 is a clamping ring 12 having a collar portion 13 having an inner diameter corresponding to the inner diameters of the fitting 1 and rib 6. The collar also has an annular rib 14 provided with an outer face 15 corresponding with the bevel 9 and which joins with the inner face 16 of the collar in a rounding face 17. If the flow opening 2 is to be continued on the outlet side of the diaphragm, the collar of the upper clamping ring may be provided with internal threads 18 for attaching a suitable pipe or duct (not shown). The clamping ring 12 also includes a radial annular flange 19 corresponding with the flange 7 and which is provided with openings 20 registering with openings 21 in the flange 7 to pass fastening devices such as bolts 22, the bolts being preferably provided with washers 23 between the heads 24 and flange 7 and between the flange 19 and the nuts 25 of the bolts.

Since the diaphragm 10 is to function at relatively low pressure differentials, it is formed of relatively thin, light-weight, non-corrosive, preferably non-sparkable metal that may be readily drawn to shape for providing a central dome portion 26 and an annular anchoring flange 27 which extends therefrom in a rounding curve 28 corresponding with the curvature of the face 17. When in use the flange 27 is adapted to be clamped and shaped to the bevel of the clamping faces of the clamping rings and the marginal edge 29 may extend outwardly between the flanges of the clamping rings as shown in Fig. 1.

As above stated, the diaphragm, being formed of relatively thin material, is adapted to deform or collapse under pressures within the safe working pressure differentials and to prevent this difficulty the present invention contemplates support of the dome-shaped portion of the diaphragm by the supporting member 11. The supporting member 11 is constructed of relatively thin formable material but having sufficient strength to adequately support the dome portion of the diaphragm. The support 11 is shaped to provide a central dome portion 30 having an exterior face 31 conforming to the concave face 32 of the diaphragm so that the diaphragm is adapted to be sustained over substantially its entire area. The support also includes an annular flange 33 curving outwardly as at 34 to conform with the curved portion 28 of the diaphragm and which terminates in a flaring portion 35 corresponding to the flaring portion of the diaphragm flange. The marginal edge of the flange may also terminate in a laterally extending annular rim engaging under the corresponding rib of the diaphragm. The dome portion of the diaphragm has a central opening 36 from which radiates a plurality of slots 37 to form substantially sector-shaped tongues 38. The tongues are loosely connected together by means of a concavo-convex disk 39 that conforms in shape with the central portion of the diaphragm support and which is retained in connecting relation with the tongues by means of clips 40 that are secured to the tongues by spot welds or the like 41 and which are provided with projecting portions 42 engaging under the periphery of the disk to retain the disk in connecting relation with the tongues of the diaphragm support.

In using the diaphragm support it is placed within the frangible diaphragm and the flange thereof is seated within the seat of the clamping ring 4. The clamping ring 12 is then applied to engage the outer face of the diaphragm flange. The flanges are then drawn together by means of the bolts to securely anchor the diaphragm and its support and to provide a leak-tight connection around the peripheries thereof. The diaphragm support will adequately retain the diaphragm in position and prevent any distortion or collapse thereof under differential pressures within the safe working pressure of the equipment with which the diaphragm is used. The support also prevents breathing of the diaphragm under change in internal pressures which might produce fatigue to the extent that the diaphragm would fracture at the pressure differentials below that for which it was originally designed.

In operation, pressure in the equipment to be protected operates on the concave side of the diaphragm through the slots 37. When the pressure differential rises above that for which the diaphragm was designed, the diaphragm ruptures and the sudden release of pressure effects opening of the sector-shaped tongues as shown in Fig. 4. In functioning of the support, the connecting disk blows out with the diaphragm so that the tongues are released therefrom and the tongues spread apart and open the passageway for free relief of the pressure.

Figure 5:
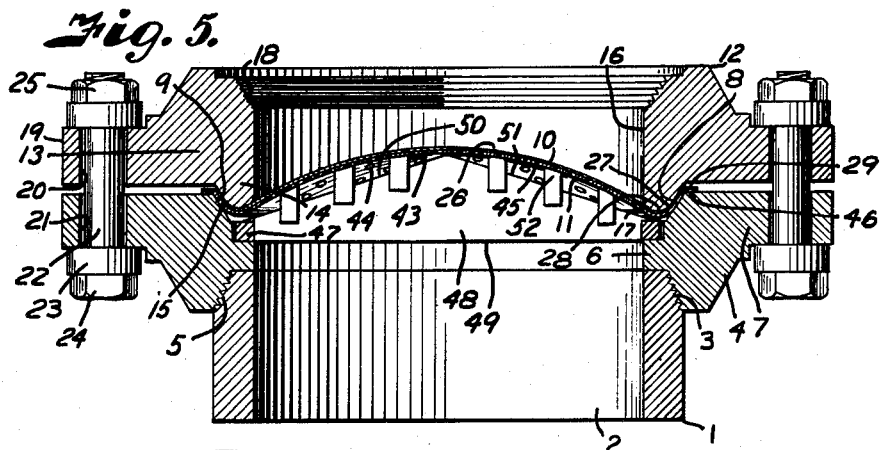
Fig. 5 is a section through a modified form of the invention.
Figure 6:
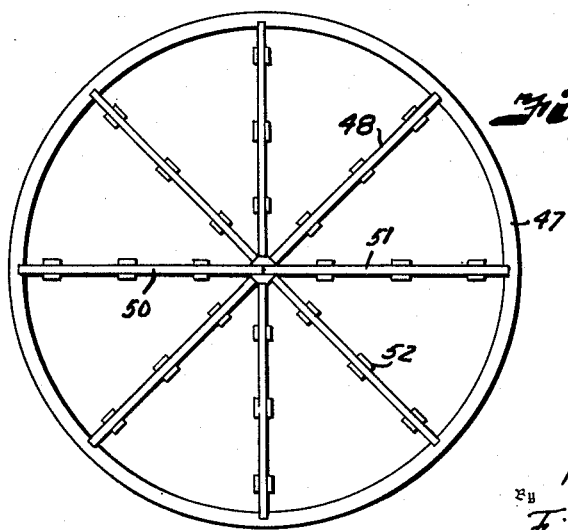
Fig. 6 is a plan view of the diaphragm support shown in Fig. 5.

In the form of the invention shown in Fig. 5, the frangible diaphragm and clamping rings therefor are substantially of the same construction as the corresponding parts in the form just described, however, the supporting member includes a relatively thin, dome-shaped member 43 having perforations 44 through which pressure acts on the underside of the frangible diaphragm. The supporting member 45 has an annular flange 46 that engages the flange of the diaphragm and is adapted to be clamped therewith between the clamping rings.

The lower clamping ring has a shoulder-like annular recess below the bevelled clamping face to seat an annular ring 47 carrying a plurality of radial arms or spokes 48 having straight lower edges 49 and tapering upper edges 50 and 51 converging directly under the elliptical portion of the supporting member as best shown in Fig. 5.

The supporting member is sustained circumferentially of the juncture of the radial supports by strips 52 secured to opposite sides of the supports and which have ends engaging the supporting member 44. When the pressures acting on the underside of the diaphragm increase to the point where the frangible diaphragm will rupture, the frangible diaphragm will give away in the same manner as the diaphragm previously described and the sudden rush of pressure fluid through the opening will disrupt the supporting diaphragm to provide substantially free relief of the equipment under protection of the safety device.

From the foregoing it is obvious that we have provided a diaphragm support which is adapted for satisfactory support of a relatively thin frangible diaphragm and which will open or give away to allow free relief when the diaphragm fractures under pressures above the working differential for which the diaphragm has been designed.

What we claim and desire to secure by Letters Patent is:

1. A support for a rupturable dome-shaped diaphragm of the character described including a member having a dome-shaped portion adapted to engage within the dome of the diaphragm and having slots extending through said dome portion from the center toward the periphery thereof to provide a plurality of substantially sector-shaped tongues adapted to open under sudden rush of pressure fluid incidental to rupturing of the diaphragm.

2. A support for a rupturable dome-shaped diaphragm of the character described including a member having a dome-shaped portion adapted to engage within the dome of the diaphragm and having slots extending through said dome portion from the center toward the periphery thereof to provide a plurality of substantially sector-shaped tongues adapted to open under suddent rush of fluid incidental to rupturing of the diaphragm, and means loosely connecting the tongues for retaining the tongues in supporting relation with the dome portion of said diaphragm.

3. A support for a rupturable dome-shaped diaphragm including a sheet metal member having a dome-shaped portion adapted to engage within the dome of the diaphragm and having slots extending through said dome portion to provide a plurality of tongues adapted to open under rush of pressure fluid upon rupturing of the diaphragm with which the support is to be used.

4. A support for a rupturable dome-shaped diaphragm including a member having a dome-shaped portion adapted to engage within the dome of the diaphragm and having slots to provide a plurality of tongues adapted to open under sudden rush of pressure fluid upon rupturing of the diaphragm with which the support is to be used, and means for retaining the tongues in supporting relation with the dome portion of said diaphragm.

5. A support for a rupturable dome-shaped diaphragm including a member having a dome-shaped portion adapted to engage within the dome of the diaphragm and having slots extending through said dome portion from the center toward the periphery thereof to provide a plurality of substantially sector-shaped tongues adapted to open under sudden rush of pressure fluid upon rupturing of the diaphragm with which the support is to be used, a disk loosely engaged in the dome portion of the supporting member, and clips connected to said tongues and having portions engaging said disk for loosely connecting the tongues to retain the tongues in supporting relation with the dome portion of the diaphragm.

6. A safety device of the character described including a frangible dome-shaped diaphragm having an annular flange, clamping members encircling the diaphragm and having clamping portions for anchoring said flange, a supporting member for the diaphragm having a dome portion adapted to engage within the dome portion of the diaphragm and having an annular flange extending between the clamping portions of the clamping members in juxtaposition with the flange of the diaphragm, said supporting member having slots extending through the dome portion from the center toward the flange of the supporting member to provide a plurality of sector-shaped tongues adapted to open under rush of pressure fluid when the diaphragm ruptures responsive to a predetermined pressure differential on the respective sides of the diaphragm.

7. A safety device of the character described including a frangible dome-shaped diaphragm having an annular flange, clamping members encircling the diaphragm and having clamping portions for anchoring said flange, a supporting member for the diaphragm having a dome portion adapted to engage within the dome portion of the diaphragm and having an annular flange extending between the clamping portions of the clamping members in juxtaposition with the flange of the diaphragm, said supporting member having slots extending through the dome portion from the center toward the flange of the supporting member to provide a plurality of sector-shaped tongues adapted to open under rush of pressure fluid when the diaphragm ruptures responsive to a predetermined pressure differential acting on the respective sides of the diaphragm, and means loosely connecting the tongues for retaining the tongues in supporting relation with the dome portion of the diaphragm.

8. A safety device of the character described including a frangible dome-shaped diaphragm having an annular flange, clamping members encircling the diaphragm and having clamping portions for anchoring said flange, a supporting member for the diaphragm having a dome portion adapted to engage within the dome portion of the diaphragm and having an annular flange extending between the clamping portions of the clamping members in juxtaposition with the flange of the diaphragm, said supporting member having slots extending through the dome portion from the center toward the flange of the supporting member to provide a plurality of sector-shaped tongues adapted to open under rush of pressure fluid when the diaphragm ruptures responsive to a predetermined pressure differential on the respective sides of the diaphragm, a disk loosely engaged in the dome of the supporting member, and clips on said tongues and having portions engaging said disk for connecting the tongues to retain the tongues in supporting relation with the dome portion of the diaphragm.

ROY L. SIMPSON.
ROBERT S. COFFMAN.

REFERENCES CITED

The following references are of record in the file of this patent:

UNITED STATES PATENTS

| Number | Name | Date |
|---|---|---|
| 138,171 | Matthews | Apr. 22, 1873 |
| 1,930,960 | Raymond | Oct. 17, 1933 |
| 1,933,117 | Markle | Oct. 31, 1933 |
| 2,095,828 | Nerad | Oct. 12, 1937 |
| 2,123,662 | Raymond | July 12, 1938 |
| 2,283,439 | Herman | May 19, 1942 |
| 2,387,353 | Raymond | Oct. 23, 1945 |

FOREIGN PATENTS

| Number | Country | Date |
|---|---|---|
| 129,460 | Great Britain | July 17, 1919 |
| 10,846 | Netherlands | Apr. 15, 1924 |
| 315,236 | Italy | Feb. 20, 1934 |
| 644,572 | Germany | May 7, 1937 |